US012499958B2

United States Patent
Yokoyama (10) Patent No.: US 12,499,958 B2
(45) Date of Patent: Dec. 16, 2025

(54) SRAM INTERNAL DFT CIRCUIT WITHOUT OUTPUT HOLD DEGRADATION

(71) Applicant: Taiwan Semiconductor Manufacturing Company, Ltd., Hsinchu (TW)

(72) Inventor: Yoshisato Yokoyama, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 244 days.

(21) Appl. No.: 18/331,633

(22) Filed: Jun. 8, 2023

(65) Prior Publication Data
US 2024/0412794 A1   Dec. 12, 2024

(51) Int. Cl.
  G11C 29/10   (2006.01)
  G11C 11/419  (2006.01)
  G11C 29/12   (2006.01)
(52) U.S. Cl.
  CPC ......... G11C 29/10 (2013.01); G11C 11/419 (2013.01); G11C 29/12015 (2013.01)
(58) Field of Classification Search
  CPC . G11C 29/10; G11C 11/419; G11C 29/12015; G11C 29/32; G11C 11/413; G11C 11/416; H10B 10/10; H10B 10/12
  See application file for complete search history.

(56) References Cited

U.S. PATENT DOCUMENTS

| 6,237,122 | B1* | 5/2001 | Maki ................. G11C 29/32 714/730 |
| 9,098,486 | B1* | 8/2015 | Tan .................. G06F 11/27 |
| 2010/0155782 | A1 | 6/2010 | Chang | |
| 2010/0332928 | A1* | 12/2010 | Li .............. G01R 31/318552 714/E11.155 |
| 2019/0229216 | A1 | 7/2019 | Nakagawa et al. | |

(Continued)

FOREIGN PATENT DOCUMENTS

| TW | 201812727 A | 4/2018 |
| TW | 201919333 A | 5/2019 |

(Continued)

OTHER PUBLICATIONS

L. R. Juracy, M. T. Moreira, F. A. Kuentzer, F. G. Moraes and A. M. Amory, "An LSSD Compliant Scan Cell for Flip-Flops," 2018 IEEE International Symposium on Circuits and Systems (ISCAS), Florence, Italy (Year: 2018).*

(Continued)

Primary Examiner — Alexander Sofocleous
Assistant Examiner — James S Wells
(74) Attorney, Agent, or Firm — Foley & Lardner LLP (57) ABSTRACT

A semiconductor device and a method of operating the semiconductor device are disclosed. In one aspect, the semiconductor device includes a memory circuit configured to receive a clock signal and generate an output signal. The memory circuit includes a timing delay circuit. The semiconductor device includes a design-for-test (DFT) circuit comprising a shadow latch. The DFT circuit is configured to receive an output of the timing delay circuit, and generate a DFT output signal via the shadow latch. A first output hold of the output signal is about equal to a second output hold of the DFT output signal.

20 Claims, 7 Drawing Sheets

(56) References Cited

U.S. PATENT DOCUMENTS

| | | | |
|---|---|---|---|
| 2020/0202968 A1* | 6/2020 | Ishii | G11C 29/12015 |
| 2020/0320924 A1 | 10/2020 | Kurokawa | |
| 2021/0233460 A1 | 7/2021 | Kurokawa | |
| 2022/0085067 A1 | 3/2022 | Or-Bach et al. | |
| 2023/0146353 A1 | 5/2023 | Or-Bach et al. | |

FOREIGN PATENT DOCUMENTS

| | | | |
|---|---|---|---|
| TW | 202013337 A | 4/2020 | |
| TW | 202211187 A | 3/2022 | |

OTHER PUBLICATIONS

Office Action issued in connection with Taiwan Appl. No. 112144991 dated Aug. 15, 2024.

* cited by examiner

SRAM INTERNAL DFT CIRCUIT WITHOUT OUTPUT HOLD DEGRADATION

BACKGROUND

The semiconductor industry has experienced rapid growth due to continuous improvements in the integration density of a variety of electronic components (e.g., transistors, diodes, resistors, capacitors, etc.). For the most part, this improvement in integration density has come from repeated reductions in minimum feature size, which allows more components to be integrated into a given area.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Static random access memory circuits provide an efficient and reliable solution for high-speed data storage in a wide range of applications, such as computing devices, embedded systems, and communication devices. One advantage of SRAM circuits lies in their ability to retain data without constant refreshing, offering faster access times, and lower power consumption compared to alternative memory technologies. Furthermore, SRAM circuits often employ advanced design techniques, including error correction mechanisms and redundancy, to ensure data integrity and enhance overall system performance.

Circuit testing and verification techniques, such as design-for-test techniques, may be utilized to test SRAM circuits during and after manufacturing. Such approaches can be utilized to facilitate the identification and correction of manufacturing defects, ensuring high yield rates and cost-effective production processes. Testing techniques such as DFT may involve implementing additional logical circuit components, such as scan chains and shadow latches, to improve testability and fault detection. By enabling comprehensive testing of the memory array, these techniques help to maintain the reliability and quality of SRAM circuits while accommodating the increasing demands for higher memory densities and faster performance in modern electronic devices.

However, challenges arise when implementing such SRAM circuits, because care must be taken to ensure the output of the DFT portion of the circuit operates at timing that is similar to the output during normal operation of the circuit. Approaches utilizing alternatives to the techniques described herein must utilize additional circuitry external to the SRAM circuit to compensate for the narrow time windows for valid data when operating SRAM circuits in a DFT mode (e.g., implementing a SWT process). The narrow time window to read valid data may be referred to as output hold degradation. The techniques described herein address these and other issues by providing SRAM circuits that utilize a timing path through the SRAM circuit that is similar to the path utilized in the SRAM circuit during normal operation. This ensures that the output of the SRAM circuit has an output hold time when operating in a DFT mode that is similar to the output hold time under normal operating conditions, effectively eliminating output hold degradation.

Figure 1:
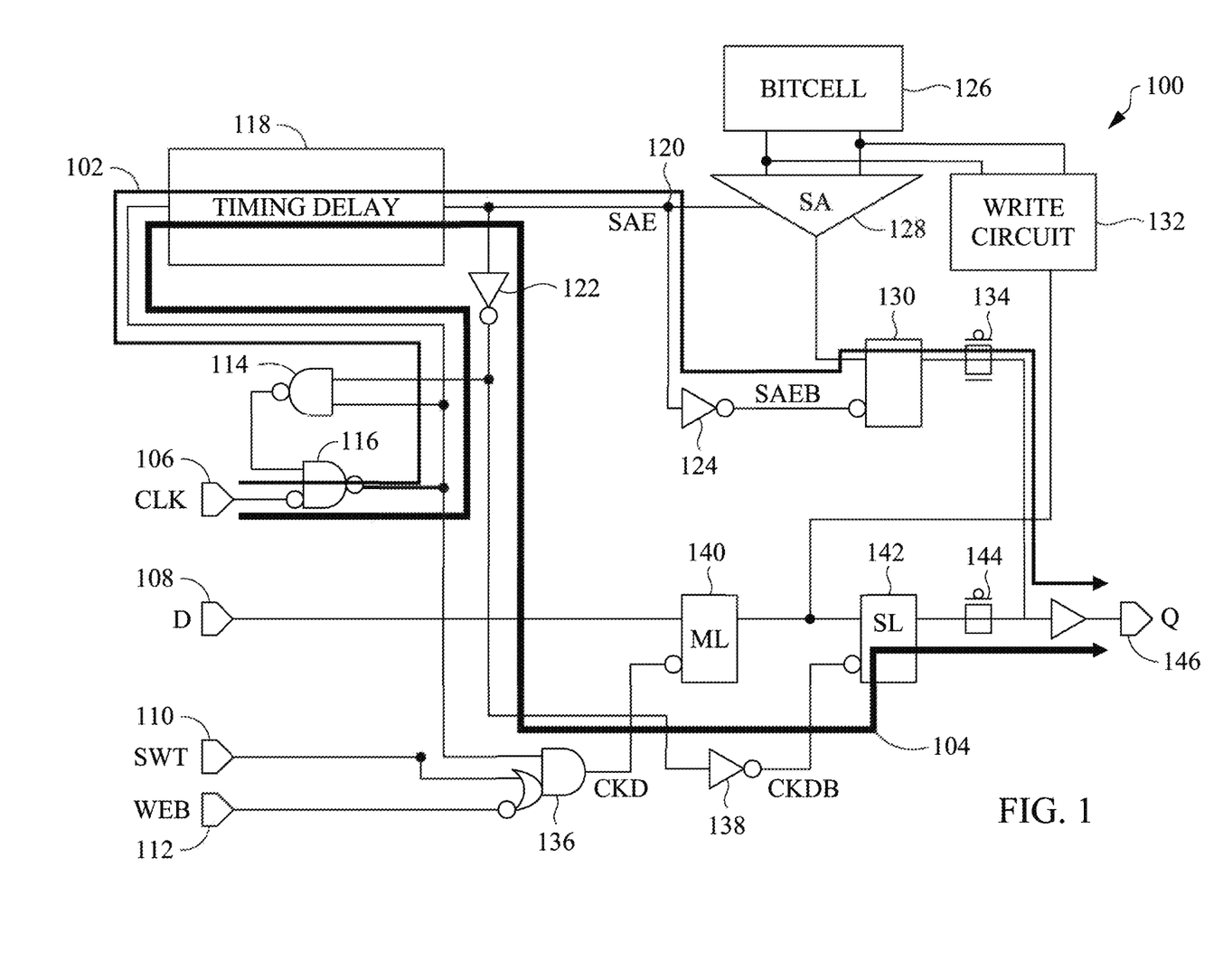
FIG. 1 illustrates a schematic block diagram of a static random access memory (SRAM) circuit that implements design for test (DFT) mode scan write test (SWT) functionality without output hold degradation, in accordance with some embodiments.

FIG. 1 illustrates a schematic block diagram of an SRAM circuit 100 that implements DFT mode SWT functionality without output hold degradation, in accordance with some embodiments. An SRAM circuit is a type of memory circuit that may be used in computer systems. SRAM circuits include a volatile memory element (e.g., the bitcell 126) that can store digital data for as long as power is supplied to it. Each of the components shown in the SRAM circuit 100 may receive power from one or more voltage sources. The SRAM circuit 100 may include one or more logic gates and sub-circuits, each of which may be constructed from one or more logic gates. Logic gates are electronic devices that perform logical operations on one or more input signals to produce a single output signal.

Various embodiments of the circuits and logic gates that implement the SRAM circuit 100 may include various transistors. The transistors described herein may have a certain type (n-type or p-type), but embodiments are not limited thereto. The transistors can be any suitable type of transistor including, but not limited to, metal oxide semiconductor field effect transistors (MOSFET), complementary metal oxide semiconductors (CMOS) transistors, P-channel metal-oxide semiconductors (PMOS), N-channel metal-oxide semiconductors (NMOS), bipolar junction transistors (BJT), high voltage transistors, high frequency transistors, P-channel and/or N-channel field effect transistors (PFETs/NFETs), FinFETs, planar MOS transistors with raised source/drains, nanosheet FETs, nanowire FETs, or the like.

As shown, the SRAM circuit 100 receives a clock input signal 106 (shown as "CLK"), a data input signal 108 (shown as "D"), a SWT enable signal 110 (shown as "SWT," and sometimes referred to as a "DFT enable signal"), and a write enable signal 112 (shown as "WEB"). The write enable signal 112, in this example, may be an "active low" signal. An active low signal refers to a type of signal that is considered to be active or valid when it is at a logic level of low or "zero" voltage (e.g., a ground voltage). In other words, the signal is active or true when it is in a low state, and inactive or false when it is in a high state. The write enable signal 112 is a signal that activates a write operation to the bitcell 126 of the SRAM circuit 100. The SWT enable signal 110 indicates that a DFT mode of the SRAM circuit 100 is activate, and activates various components of the SRAM circuit 100 as described herein to perform SWT and/or other DFT functionality. The SWT enable signal 110, in this example, may be an active high signal. An active high signal refers to a type of signal that is considered to be active or valid when it is at a logic level of high or "one" voltage (e.g., about close to one or more logic supply voltages of the SRAM circuit). In other words, the signal is active or true when it is in a high state, and inactive or false when it is in a low state.

The clock signal 106 may be utilized to synchronize the timing of various components within the SRAM circuit. The clock signal 106 can be a regularly repeating signal that cycles between high and low voltage levels at a predetermined frequency (e.g., a square wave signal). The clock signal 106 may be generated by an oscillator circuit that provides the clock signal to the components of the SRAM circuit 100. As shown, the clock signal is provided as input to a first NAND gate 116 through a negative input (e.g., via an inverter). The output of the first NAND gate 116 is provided as a first input to the second NAND gate 114.

The second NAND gate 114 receives the output of the inverter 122 as a second input, described in further detail herein in connection with the timing delay circuit, and generates a corresponding signal that is provided as the second input to the first NAND gate 116. The feedback loop created by the first NAND gate 116, the timing delay circuit 118, and the second NAND gate 114 in a NAND output signal at the output of the first NAND gate 116 that is a delayed version of the input clock signal. This output signal generated by the first NAND gate 116 is provided as input to the timing delay circuit, and as input to the logic gates 136 that mediate write operations and DFT mode operations, as described herein.

The timing delay circuit 118 is a circuit that receives the output signal generated by the first NAND gate 116 and generates a sense amplifier enable signal 120. The timing delay circuit 118 can be any type of electronic circuit that introduces a specific delay between the input and output signals. The timing delay circuit 118 can be used to generate a delayed version of the output of the second NAND gate 116, which itself is a logically delayed version of the input clock signal 106. In this example configuration, the timing delay circuit 118 generates the enable signal for the sense amplifier 128. For example, the timing delay circuit 118 can generate the sense amplifier enable signal 120 such that the sense amplifier 128 is enabled after the data from the bitcell 126 has been correctly stored and stabilized.

As shown, the sense amplifier enable signal 120 (shown as "SAE") is provided as input to the sense amplifier 128, the first inverter 122, and the second inverter 124. The second inverter 124 provides a respective output that is the logical inverse (shown as "SAEB") of the sense amplifier enable signal 120 as an enable input to the sense amplifier latch 130. The first inverter 122 provides the same logical signal as SAEB as an input to the second NAND gate 114 and as input to the third inverter 138, which generates a logically inverted version of the SAEB signal as an enable input to the shadow latch 142 (shown as CKDB). The CKDB signal (e.g., the enable input for the shadow latch 142) has the same logical state as the sense amplifier enable signal 120, with a delay caused by the first inverter 122 and the third inverter 138.

The bitcell 126 may be a unit of memory that can be addressed and manipulated using the components of the SRAM circuit 100. The bitcell 126 can be a memory cell that can store a single bit of binary data. The bitcell 126 may have any suitable configuration, and any type of bitcell may be utilized to implement the bitcell 126 in the SRAM circuit 100. For example, in some implementations, the bitcell 126 may include multiple transistors arranged to form a bistable latch that can hold the binary value of 0 or 1. The data stored in the bitcell 126 may be modified by the write circuit 132 (e.g., a write operation), and accessed by the sense amplifier 128 (e.g., a read operation). When data is written to the SRAM, the bitcell is set to the desired binary value, and when data is read from the SRAM, the bitcell is accessed and the stored binary value is retrieved.

The sense amplifier 128 of the SRAM circuit 100 is an electronic circuit that amplifies and detects the small voltage difference between two complementary bitlines in the bitcell 126. The sense amplifier 128, when enabled by the sense amplifier enable signal 120 (e.g., being in a logic high state) can amplify the voltage difference between two bitlines of the bitcell 126, which correspond to the stored binary data, and convert it into a logic-level output signal that is provided as input to the sense amplifier latch 130. The sense amplifier latch 130 provides an output of the SRAM circuit 100 via the transistors 134 when the SRAM circuit 100 is operating in a normal mode (e.g., a "mission" mode).

The write circuit 132 of the SRAM circuit 100 can be an electronic circuit that can write data into the bitcell 126. Although not shown in FIG. 1 for visual clarity, in some implementations, the write circuit 132 may receive the write enable signal 112 (or a logical inverse or derivative signal generated from the write enable signal 112), and can be enabled or activated. The write circuit 132 may include various logical components, such as a write driver and a bitline precharge circuit. To write data to the bitcell 126, the write circuit 132 (e.g., upon being enabled by an enable signal, etc.) can receive the data at the output of the master latch 140. A write driver of the write circuit 132 can apply a voltage to the bitcell 126, which causes the bitcell 126 to change its state to the desired binary value.

A bitline precharge circuit of the write circuit 132 may ensure that the other complementary bitline of the bitcell 126 remains at a pre-charged voltage level to avoid any interference between the two bitlines. Once data has been written to the bitcell 126, said data can be accessed by the sense amplifier 128 via the sense amplifier latch 130, as described herein. In some implementations, various circuitry can be implemented in the SRAM circuit 100 to prevent reading to the bitcell 126 during a write operation, or to prevent writing to the bitcell 126 during a write operation. In some implementations, the write circuit 132 may also be enabled during a SWT operation (e.g., when the SWT enable signal 110 is active). For example, and as described in further detail herein, the DFT mode of the SRAM circuit 100 may be utilized to write predetermined binary data into the bitcell 126, which can then be scanned out and compared with the expected pattern to evaluate the SRAM circuit 110.

Each of the master latch 140, the shadow latch 142, and the sense amplifier latch 130 can receive at least two input signals and provide one output signal. Each of the master latch 140, the shadow latch 142, and the sense amplifier latch 130 may be an electronic circuit that can store a single bit of binary data. It has two stable states, which are determined by the input signal and an enable signal. Each of the master latch 140, the shadow latch 142, and the sense amplifier latch 130 can receive an active-low enable signal, designated by the circle at the bottom left of the respective latch. When the enable signal for the respective latch is at a logic low (e.g., active), the output of the respective latch (e.g., the signal at the top-right of the respective latch) is set to match the input of the respective latch (e.g., the signal at the top-left of the respective latch.). The output of the latch remains in its current state until the next input signal change or until the enable signal changes. If the enable signal is logic high (e.g., inactive), the output of the latch remains unchanged, even if the set inputs changes state.

The SRAM circuit 100 includes at least one output signal 146, which is shown as "Q" in the diagram. The output signal 146 can be selected by the multiplexer formed via the transistors 134 and the transistors 144. The multiplexer can be a two-input multiplexer, and may be selected in part based on a DFT enable signal (e.g., the SWT enable signal, another signal that is active when the SRAM circuit 100 is in the DFT mode, etc.).

The first transistors 134 and the second transistors 144 can therefore collectively form a two-input, four transistor multiplexer that enables selection between the output of the shadow latch 142 and the output of the sense amplifier latch 130, thereby defining two timing pathways (the normal operating pathway 102, the DFT mode pathway 104) through the SRAM circuit, as shown. The four-transistor multiplexer circuit can include two pairs of complementary transistors (e.g., the first transistor pair 134 and the second transistor pair 144). The first transistor pair 134 and the second transistor pair 144 are each shown a PMOS and an NMOS transistor. The first transistor pair 134 acts as a switch for the output of the sense amplifier latch 130, and the second transistor pair 144 acts as a switch for the shadow latch 142 output. The transistor pairs 134 and 144 are connected in series, forming a common node that is provided as input to a buffer, which provides the output signal 146 of the SRAM circuit 100.

As shown, two timing paths are defined through the SRAM circuit 100. The first timing path 102 is a timing path via which output data propagates during normal operation of the SRAM circuit 100 (e.g., when the SWT enable signal 110 is logic low, and the clock signal 106 is oscillating normally). In such implementations, the first transistor pair 134 is on and conducting while the second transistor pair 144 is off and not conducting, which permits the output of the sense amplifier latch 130 to propagate as the output signal 146 of the SRAM circuit 100. As shown, the first timing path 102 begins at the clock signal, which propagates through the first and second NAND gates 116 and 114, respectively, and through the timing delay circuit 118, which produces the sense amplifier enable signal 120. The sense amplifier enable signal 120 can enable the sense amplifier 128 according to the timing delay circuit 118, and propagate through the second inverter 124, providing the inverted enable signal to the sense amplifier latch 130.

When the sense amplifier 128 is enabled, the sense amplifier latch 130 is therefore also enabled and changes state according to the output of the sense amplifier 128 (e.g., based on the data stored in the bitcell 126). When the sense amplifier enable signal 120 returns to logic low, the sense amplifier 128 is disabled and the SAEB signal transitions to logic high, causing the sense amplifier latch 130 to maintain the output value of the sense amplifier 128 as an output. Because the transistor pair 134 is conducting, the output of the sense amplifier latch 130 is propagated through a buffer as the output signal 146 of the circuit, completing the first timing path.

The second timing path 104 is a timing path via which output data propagates during a DFT operation (e.g., a scan write test) of the SRAM circuit 100 (e.g., when the SWT enable signal 110 is logic high, and the clock signal 106 is oscillating normally). In such implementations, the first transistor pair 134 is off and not conducting while the second transistor pair 144 is on and conducting, which permits the output of the shadow latch 142 to propagate as the output signal 146 of the SRAM circuit 100.

To ensure that the output hold of the SRAM circuit is the about the same during operation of the first timing path 102 and the second timing path 104, SRAM circuit 100 is configured such that the second timing path 104 also propagates through the timing delay circuit 118, which during a normal operating mode manages when the sense amplifier 128 is enabled, as described herein. As shown, the sense amplifier enable signal 120 propagates through the first inverter 122 and the third inverter 138, producing an enable signal for the shadow latch 142 (shown as "CKDB").

In the DFT operating mode, the SWT 110 is set to a logic high state, causing the logic gates 136 to activate the enable signal for the master latch 140. The master latch 140 can be utilized to perform write operations during a write mode (e.g., when the write enable signal 112 is logic low) or to perform SWT operations during the DFT operating mode. In this example, the logic gates include an OR gate that receives a negative input of the write enable signal 112 (which itself is an active-low signal) and the SWT 110. The OR gate of the logic gates 136 produces a logic high output when either or both of the SWT enable signal 110 or the write enable signal are active.

The output of the OR gate of the logic gates 136 is provided as an input to an AND gate of the logic gates 136. The AND gate of the logic gates 136 receives a second input from the output of the first NAND gate 116 (e.g., the same signal provided as input to the timing delay circuit 118). As such, the logic gates 136 produce an output clock signal (shown as "CKD") when either or both of the SWT enable signal 110 or the write enable signal 112 are active, and a logic low signal otherwise. The master latch 140 receives the data provided via the data input signal 108, and propagates it to the output of the master latch 140 according to the clock signal CKD (e.g., when the clock signal CKD is logic low).

In a write mode (e.g., the write enable signal 112 is logic low), the output of the master latch 140 is provided as input to the write circuit 132, which may update the data in the bitcell 126 as described herein. The output of the master latch 140 is provided as a set input to the shadow latch 142. When the SWT enable signal 110 is logic high (e.g., the write mode is active, etc.), the first transistor pair 134 is off and not conducting, and the second transistor pair 144 is on and conducting. As described herein, the shadow latch 142 receives the CKDB signal as an enable input. When the CKDB signal is logic low, the shadow latch 142 propagates its input (e.g., the output of the master latch 140) to its output. Because the second transistor pair 144 is on and conducting when the SRAM circuit 100 is operating in a DFT mode, the output of the shadow latch 142 propagates through the second transistor pair 144 and the buffer as the output signal 146 of the SRAM circuit 100. As the shadow latch 142 is enabled based on an output of the timing delay circuit 118 as shown, the output hold of the SRAM circuit 100 when operating in the DFT mode (e.g., the second timing path 104) is about equal to the output hold of the SRAM circuit 100 when operating in the normal mode.

Although the SRAM circuit 100 is shown and described as providing an output for a single bit of information, it should be understood that the techniques described herein are presented in a manner for simplicity. Indeed, it should be understood that any latch, bitcell, timing delay circuit, write circuit, input signals, or output signals may include several parallel signals (e.g., corresponding to a byte, word, double word, vector, etc.) that propagate according to the techniques described herein.

Figure 2:
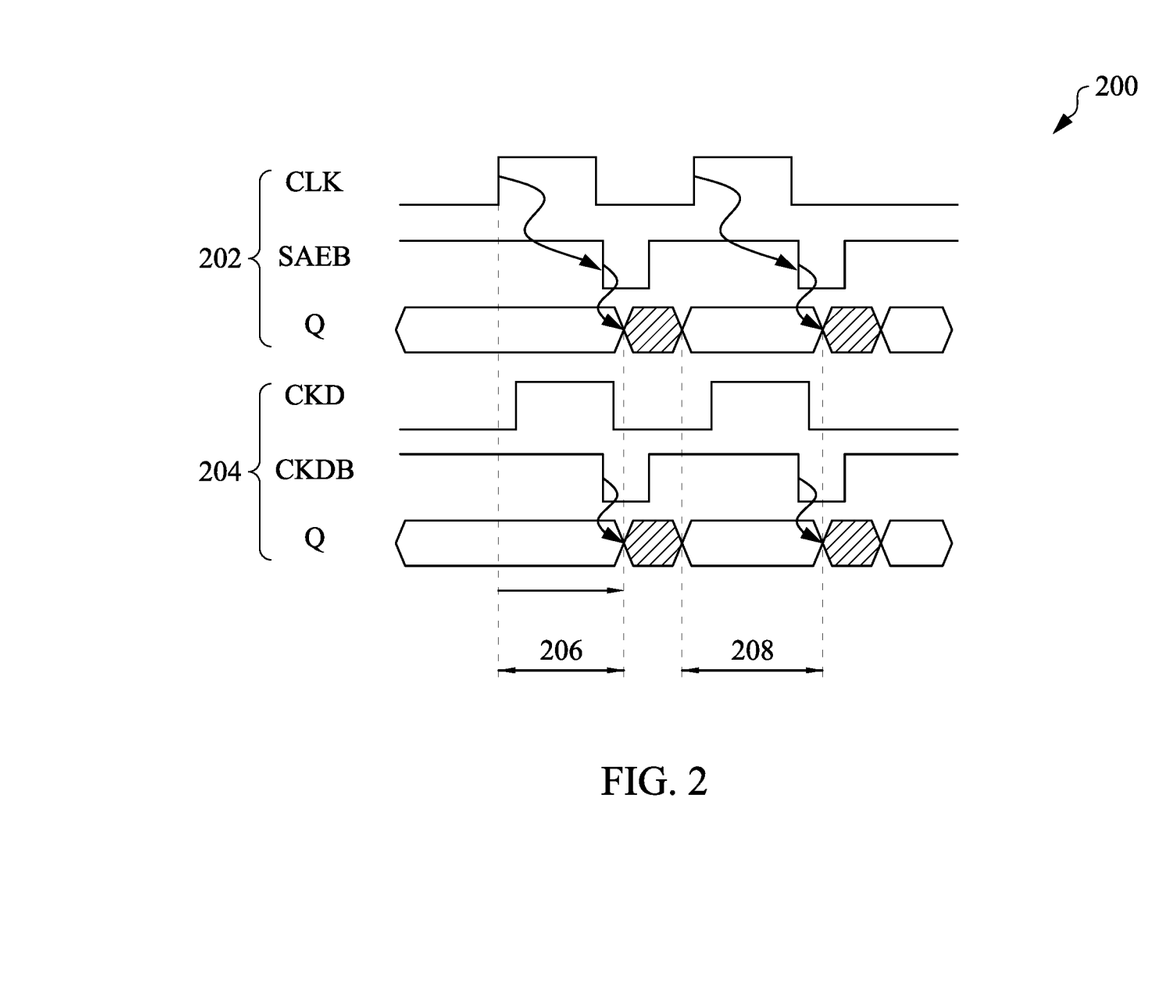
FIG. 2 illustrates waveforms of signals of the circuit shown in FIG. 1 in both normal operation mode and DFT mode, in accordance with some embodiments of the present disclosure.

Referring to FIG. 2 in the context of the components described in FIG. 1, illustrated is a graph 200 showing waveforms of signals of the SRAM circuit 100 of FIG. 1 in both normal operation mode and DFT mode, in accordance with some embodiments of the present disclosure. In the graph 200, the signals grouped under 202 show waveforms during the normal mode operation of the SRAM circuit 100 for the input clock signal CLK (e.g., the input clock signal 106), the SAEB signal (e.g., the output signal 120 of the timing delay circuit 118 propagated through the second inverter 124), and the output signal Q of the SRAM circuit (e.g., the output signal 146). As shown, when the clock signal CLK transitions to a logic high state, the timing delay circuit 118 generates a sense amplifier enable signal 120 that transitions to a logic high at around the falling edge of the clock signal CLK (reflected in the logical inverse signal SAEB as a period of logic low). As described herein, this causes the sense amplifier latch 130 to change state, reflected in the shaded region of the output signal Q. When the transition of the sense amplifier latch is complete, the output data provided by the sense amplifier latch 130 is maintained at the output signal Q because the SAEB signal has returned to logic high.

In the graph 200, the signals grouped under 204 show waveforms during DFT mode operation of the SRAM circuit 100 for the signal CKD (e.g., the input clock signal 106 gated with the first NAND gate 116 and the logic gates 136), the CKDB signal (e.g., the output signal of the third inverter 138, matching the logical state of the output of the timing delay circuit 118 including a small delay), and the output signal Q of the SRAM circuit (e.g., the output signal 146). As shown, the generated CKDB signal generated as the output of the first inverter 122 is about synchronous with the SAEB signal. The CKDB signal causes the shadow latch 130 to change state, reflected in the shaded region of the output signal Q, in a manner that is about synchronous with when the SRAM circuit 100 is operating in the normal operating mode. As such, the output hold of the SRAM circuit 100 when operating in the DFT mode is about equal to the output hold of the SRAM circuit 100 when operating in the normal mode.

Figure 3:
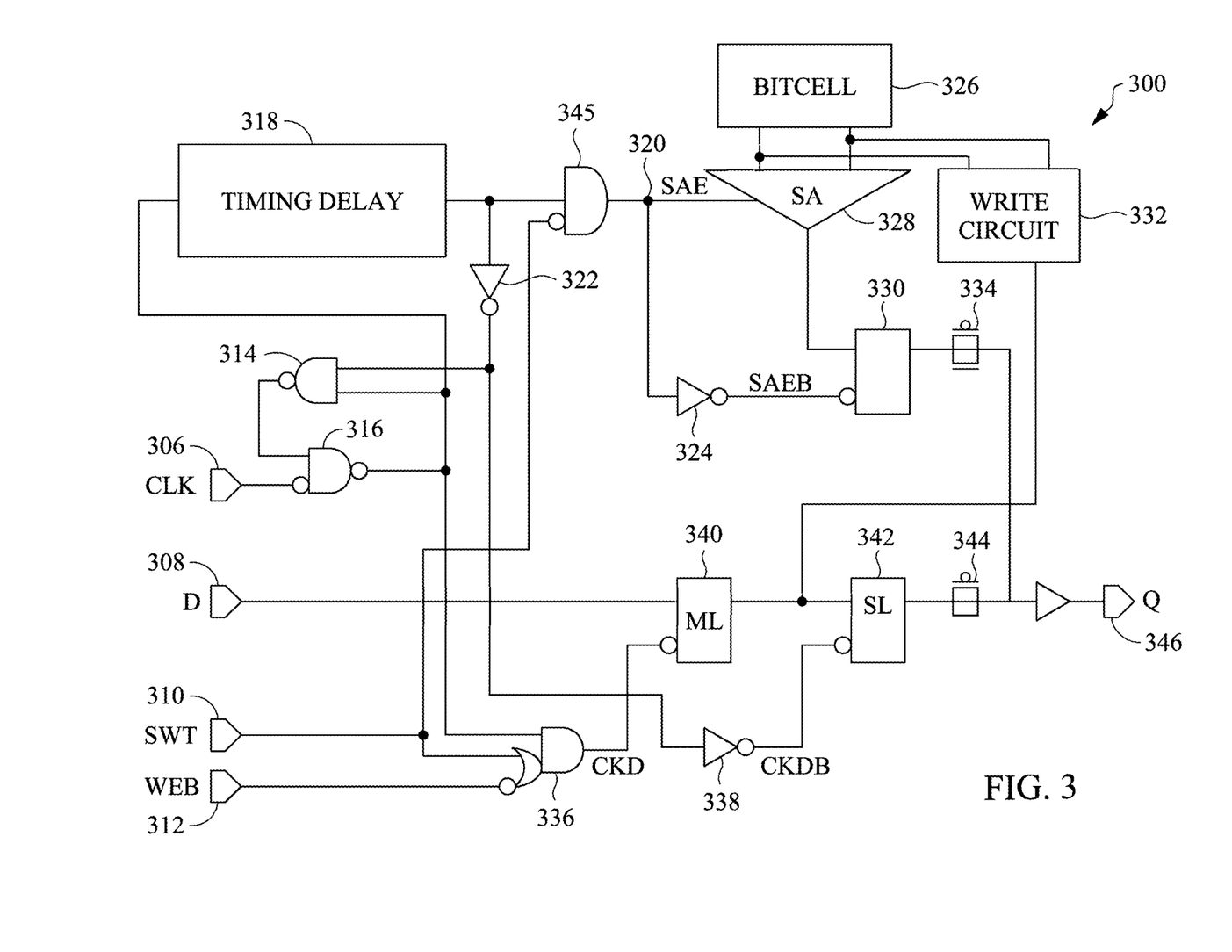
FIG. 3 illustrates a schematic block diagram of another SRAM circuit that implements DFT mode SWT functionality without output hold degradation, in accordance with some embodiments.

FIG. 3 illustrates a schematic block diagram of another SRAM circuit 300 that implements DFT mode SWT functionality without output hold degradation, in accordance with some embodiments. As shown, the SRAM circuit 300 can be similar to the SRAM circuit 100, and any components described in connection with the SRAM circuit 300 may implement similar functionality and include any similar structure to corresponding components described in connection with FIG. 1.

For example, the input clock signal 306, the input data signal 308, the input SWT enable signal 310, and the input write enable signal 312 received by the SRAM circuit 300 may be similar to the input clock signal 106, the input data signal 108, the input SWT enable signal 110, and the input write enable signal 112 of FIG. 1. The first NAND gate 316, the second NAND gate 314, the timing delay circuit 318, the bitcell 326, the sense amplifier 328, the write circuit 332, the logic gates 336, the sense amplifier latch 330, the master latch 340, the shadow latch 342, the first inverter 322, the second inverter 324, the third inverter 338, the first transistor pair 334, and the second transistor pair 344 may each be similar to, and include any of the same structure and implement the same functionality as the first NAND gate 116, the second NAND gate 114, the timing delay circuit 116, the bitcell 126, the sense amplifier 128, the write circuit 132, the logic gates 136, the sense amplifier latch 130, the master latch 140, the shadow latch 142, the first inverter 122, the second inverter 124, the third inverter 138, the first transistor pair 134, and the second transistor pair 144 of FIG. 1

In addition to the aforementioned components, the circuit 300 includes the AND gate 345, which gates the output of the timing delay circuit 318 with a negative input of the SWT enable signal 310. As shown, the AND gate 345 produces the sense amplifier enable signal 320, which operates similarly to the sense amplifier enable signal 120 of FIG. 1. As shown, due to the negative input of the SWT enable signal 310, the sense amplifier 328 is deactivated when the circuit 300 operates in the DFT mode (e.g., the SWT enable signal is logic high), but operates in the normal mode as described in connection with FIG. 1 when the SWT enable signal is in a logic low state. This reduces overall power consumption of the SRAM circuit 300 by deactivating sense amplifier 328 when the SRAM circuit 300 is in the DFT operating mode.

Figure 4:
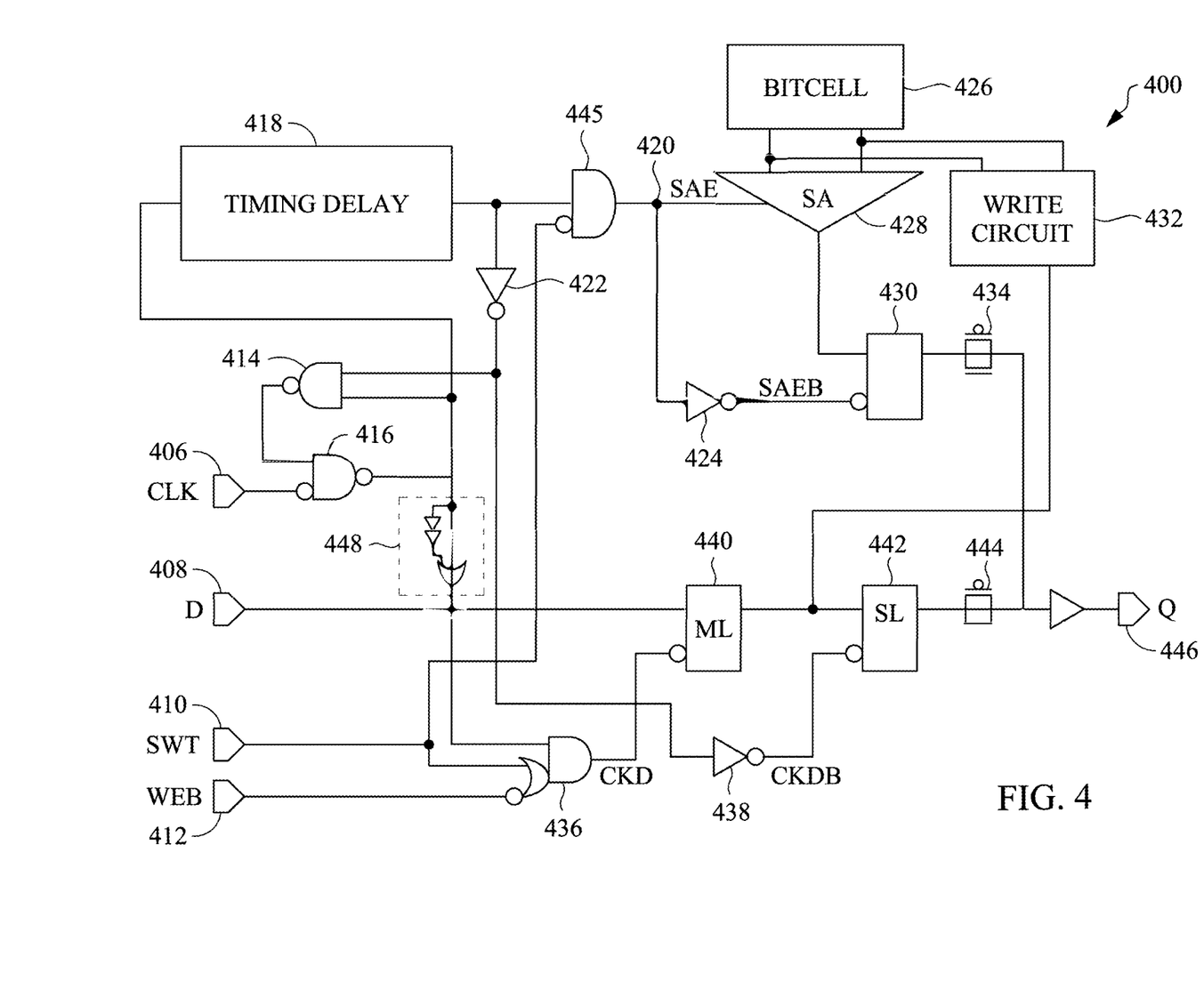
FIG. 4 illustrates a schematic block diagram of an SRAM circuit similar to the SRAM circuit shown in FIG. 3 including additional delay circuitry, in accordance with some embodiments.

FIG. 4 illustrates a schematic block diagram of an SRAM circuit 400 similar to the SRAM circuit 300 shown in FIG. 3 including additional delay circuitry, in accordance with some embodiments. Any components described in connection with the SRAM circuit 400 may implement similar functionality and include any similar structure to corresponding components described in connection with FIG. 3. For example, the input clock signal 406, the input data signal 408, the input SWT enable signal 410, and the input write enable signal 412 received by the SRAM circuit 400 may be similar to the input clock signal 306, the input data signal 308, the input SWT enable signal 310, and the input write enable signal 312 of FIG. 3.

The first NAND gate 416, the second NAND gate 414, the timing delay circuit 418, the bitcell 426, the sense amplifier 428, the write circuit 432, the logic gates 436, the sense amplifier latch 430, the master latch 440, the shadow latch 442, the first inverter 422, the second inverter 424, the third inverter 438, the first transistor pair 434, the second transistor pair 444, and the AND gate 445 may each be similar to, and include any of the same structure and implement the same functionality as, the first NAND gate 316, the second NAND gate 314, the timing delay circuit 318, the bitcell 326, the sense amplifier 328, the write circuit 332, the logic gates 336, the sense amplifier latch 330, the master latch 340, the shadow latch 342, the first inverter 322, the second inverter 324, the third inverter 338, the first transistor pair 334, the second transistor pair 344, and the AND gate 345 of FIG. 3.

As shown, the SRAM circuit 400 includes an additional delay circuit 448, which as shown receives the output of the first NAND gate 416 and provides a delayed output to the AND gate of the logic gates 436. As shown, in this example implementation, the additional delay circuit [442] 448 includes an OR gate that receives the output of the first NAND gate 416. Furthering this example, two buffers in series receive the output of the first NAND gate 416 in parallel with the OR gate, and provide a second input to the OR gate. This effectively causes the CKD signal to have a delayed high state when either or both of the SWT enable signal 410 or the write enable signal 412 are active. An example waveform showing the delay is described in connection with FIG. 5.

Figure 5:
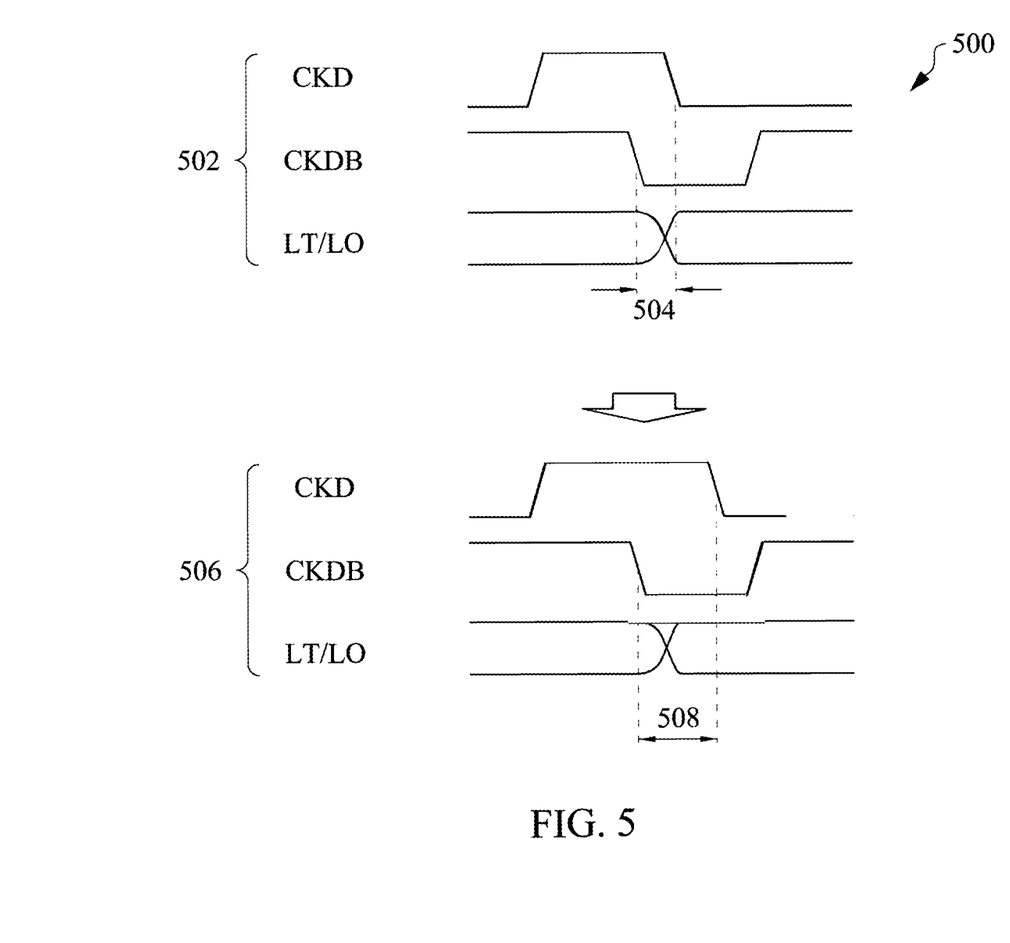
FIG. 5 illustrates waveforms of signals produced via the circuits shown in FIGS. 3 and 4 during operation of a DFT mode, in accordance with some embodiments of the present disclosure.

Referring to FIG. 5, illustrate is a graph 500 showing waveforms of signals produced via the SRAM circuits 300 and 400 shown in FIGS. 3 and 4 during operation of a DFT mode, in accordance with some embodiments of the present disclosure. As shown, the signals in group 502 are produced by the signals of the SRAM circuit 300 of FIG. 3, with the LT/LO signal corresponding to the output of the shadow latch 340. As shown, the writing period 504 of the shadow latch 340 is narrow, due to the short time window between the falling edge of the CKDB signal and the falling edge of the CKD signal. With the added delay reflected in the signals of group 506 produced by the SRAM circuit 400, the logic high period of the CKD signal is extended relative to the CKDB signal, extending the writing period 508 to be longer than the writing period 504. This ensures timing compliance with the operational margins of the shadow latch 442. The operational margin of a latch refers to the range of input signal voltage or timing variations that the latch can tolerate while still operating correctly.

Figure 6:
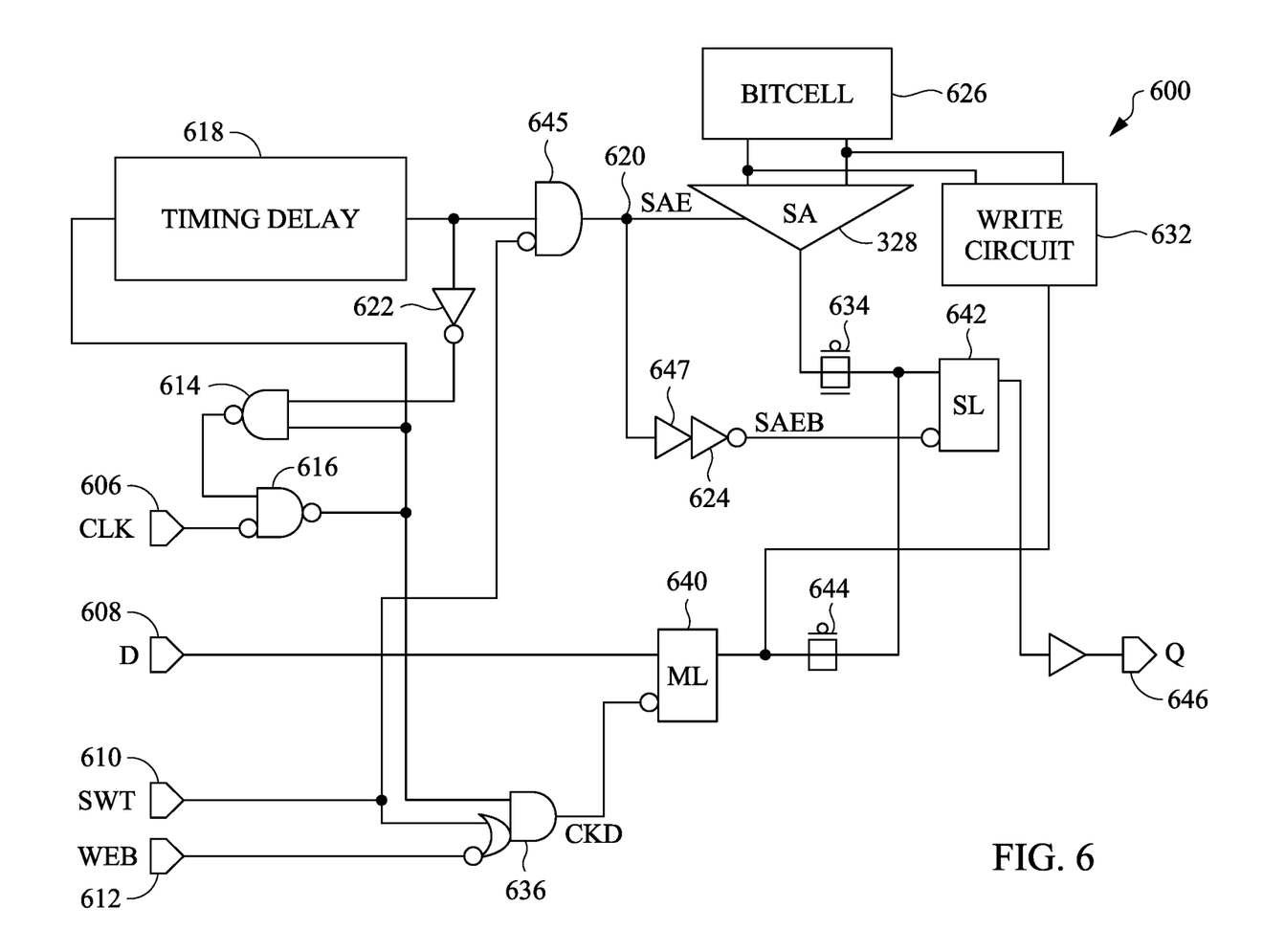
FIG. 6 illustrates a schematic block diagram of yet another SRAM circuit that implements DFT mode SWT functionality without output hold degradation, in accordance with some embodiments.

FIG. 6 illustrates a schematic block diagram of yet another SRAM circuit 600 that implements DFT mode SWT functionality without output hold degradation, in accordance with some embodiments. As shown, the SRAM circuit 600 is similar to the SRAM circuit 300, but includes one less latch, reducing overall circuit area. In particular, the sense amplifier latch 300 of the SRAM circuit 300 is absent from the SRAM circuit 600, and the shadow latch 642 is instead shared by both the sense amplifier 628 and the master latch 640. Any components described in connection with the SRAM circuit 600 may implement similar functionality and include any similar structure to corresponding components described in connection with FIG. 3. For example, the input clock signal 606, the input data signal 608, the input SWT enable signal 610, and the input write enable signal 612 received by the SRAM circuit 600 may be similar to the input clock signal 306, the input data signal 308, the input SWT enable signal 310, and the input write enable signal 312 of FIG. 3.

The first NAND gate 616, the second NAND gate 614, the timing delay circuit 618, the bitcell 626, the sense amplifier 628, the write circuit 632, the logic gates 636, the master latch 640, the shadow latch 642, the first inverter 622, the second inverter 624, the first transistor pair 634, the second transistor pair 644, and the AND gate 645 may each be similar to, and include any of the same structure and implement the same functionality as, the first NAND gate 316, the second NAND gate 314, the timing delay circuit 318, the bitcell 326, the sense amplifier 328, the write circuit 332, the logic gates 336, the master latch 340, the shadow latch 342, the first inverter 322, the second inverter 324, the first transistor pair 334, the second transistor pair 344, and the AND gate 345 of FIG. 3.

As shown, the third inverter 338 is removed from the circuit, and the output of the AND gate 645 is provided as input to an additional buffer 647 prior to propagating through the second inverter 624. In this example implementation, the shadow latch 642 operates as the sense amplifier latch 330 described in connection with FIG. 3. To do so, the multiplexer implemented by the first transistor pair 634 and the second transistor pair 644 are positioned in the SRAM circuit 600 to switch the input of the shadow latch 642, rather than the output signal 646 of the SRAM circuit 600.

When the SRAM circuit 600 is in the normal operating mode (e.g., the SWT enable signal 610 is logic low), the first transistor pair 634 is enabled, and signals from the sense amplifier 628 propagate to the shadow latch 642 (e.g., the shadow latch behaves as a sense amplifier latch). When the SRAM circuit 600 is in the DFT operating mode (e.g., the SWT enable signal 610 is logic high), the first transistor pair 634 is disabled and does not conduct, while the second transistor pair 644 is enabled and conducts, such that signals from the master latch 640 propagate to the shadow latch 642 (e.g., the shadow latch behaves as the shadow latch 142 of FIG. 1). The additional buffer 647 creates additional delay to compensate for the timing changes of the circuit configuration of the SRAM circuit 600. The signal that propagates through the shadow latch 642 (e.g., the signal from the sense amplifier 628 or the master latch 640) is provided as the output signal 646 of the SRAM circuit 600.

Figure 7:
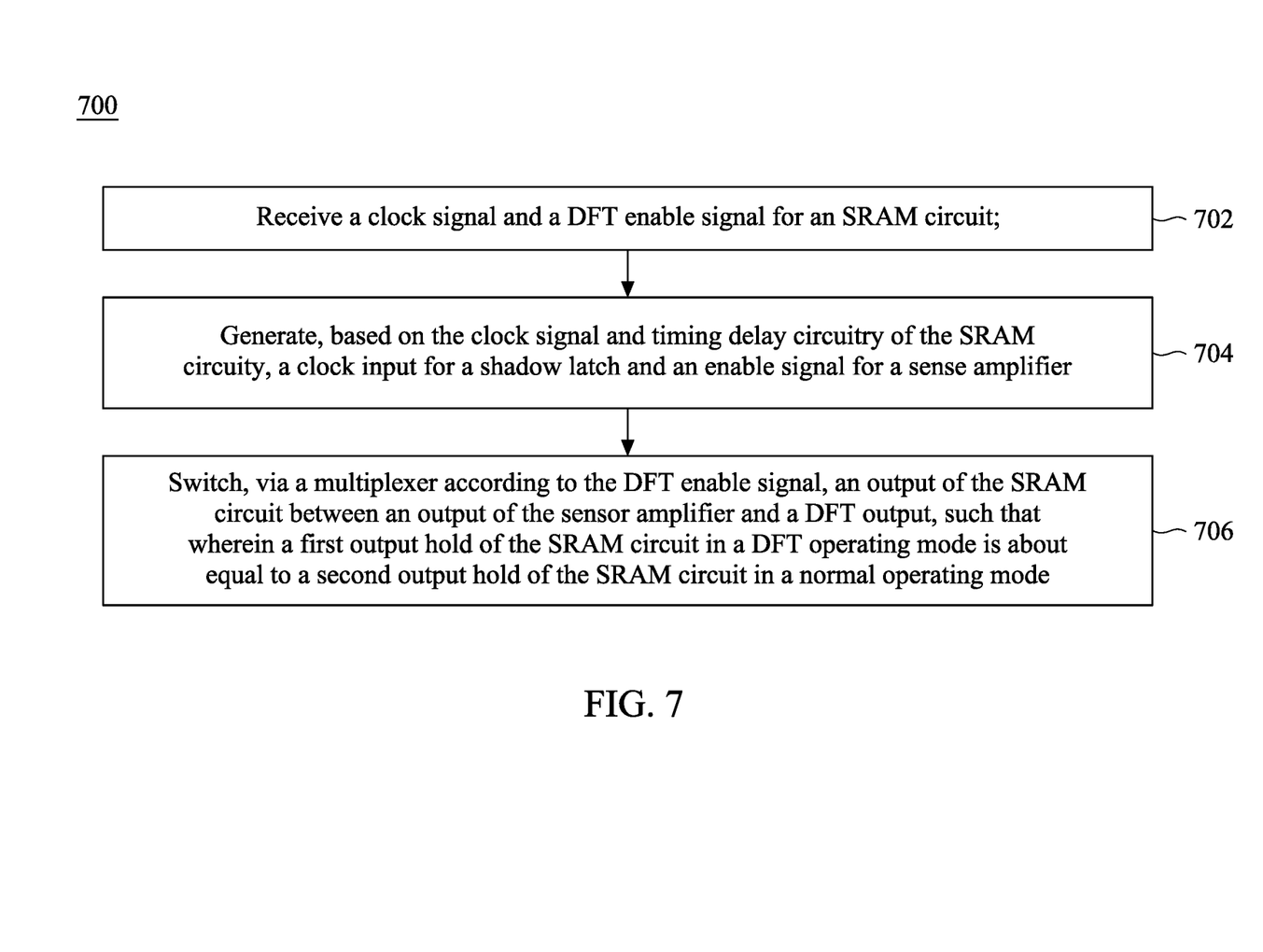
FIG. 7 illustrates a flowchart of an example method to operate the disclosed SRAM circuits described herein, in accordance with some embodiments of the present disclosure.

FIG. 7 illustrates a flowchart of an example method 700 to operate the disclosed SRAM circuits 600, in accordance with some embodiments of the present disclosure. The method 700 may be used to operate an SRAM device (e.g., the SRAM circuit 100, the SRAM circuit 300, the SRAM circuit 400, the SRAM circuit 600, etc.), in which the output hold when operating in a DFT mode is about equal to the output hold during a normal operating mode. For example, at least some of the operations described in the method 700 use layouts and schematics described in FIGS. 1, 3, 4, and 6. It is noted that the method 700 is merely an example and is not intended to limit the present disclosure. Accordingly, it is understood that additional operations may be provided before, during, and after the method 700 of FIG. 7, and that some other operations may only be briefly described herein.

In brief overview, the method 700 starts with operation 702 of receiving a clock signal and a DFT enable signal (e.g., a SWT enable signal) for an SRAM circuit. The method 700 proceeds with operation 704 of generating, based on the clock signal and a timing delay circuit of the SRAM circuit, an enable input for a shadow latch and an enable signal for a sense amplifier. The method 700 concludes with operation 706 of switching, via a multiplexer according to the DFT enable signal, an output of the SRAM circuit between an output of the sense amplifier and a DFT output. A first output hold of the SRAM circuit in a DFT operating mode is about equal to a second output hold of the SRAM circuit in a normal operating mode.

Referring to operation 702, a clock signal (e.g., the clock input signal 106) and a DFT enable signal (e.g., the SWT enable signal 110) for an SRAM circuit (e.g., the SRAM circuit 100, 300, 400, 600, etc.) are received. The clock signal may be provided via one or more oscillator circuits. The SWT enable signal may be provided as input to one or more logic gates (e.g., the logic gates 136, the AND gate 345, etc.) that cause the SRAM circuit to implement a DFT operating mode. The SWT enable signal may be received by the components of the SRAM circuit from one or more control circuits.

Referring to operation 704, an enable input (e.g., the CKDB signal) for a shadow latch (e.g., the shadow latch 142) and an enable signal (e.g., the sense amplifier enable signal 120) for a sense amplifier (e.g., the sense amplifier 128) are generated based on the clock signal and a timing delay circuit (e.g., the timing delay circuit 118, etc.) of the SRAM circuit. The enable input for the shadow latch may be generated based on an output of the timing delay circuit. For example, the input for the shadow latch may be a logical inversion or a buffered signal generated from the output of the timing circuit. The enable signal for the sense amplifier may be synchronized with (e.g., have the same logical state as) the enable input for the shadow latch. The enable signal for the sense amplifier may cause the sense amplifier to be enabled and read data from at least one bitcell.

Referring to operation 706, an output of the SRAM circuit is switched between an output of the sense amplifier (e.g., via the sense amplifier latch 130) and a DFT output (e.g., the output of the shadow latch 142, etc.) via a multiplexer (e.g., the multiplexer implemented by the first transistor pair 134 and the second transistor pair 144, etc.) according to the DFT enable signal. In some implementations, the DFT output may be provided via a master latch (e.g., the master latch, and the multiplexer switches the output of the SRAM circuit by switching an input of the shadow latch (e.g., as described in connection with FIG. 6). In such implementations, the output of the shadow latch (e.g., the shadow latch 642) is provided as the output of the SRAM circuit.

In one aspect of the present disclosure, a semiconductor device is disclosed. The semiconductor device includes a memory circuit configured to receive a clock signal and generate an output signal. The memory circuit includes a timing delay circuit. The semiconductor device includes a DFT circuit having a shadow latch. The DFT circuit can receive an output of the timing delay circuit, and generate a DFT output signal via the shadow latch. A first output hold of the output signal is about equal to a second output hold of the DFT output signal.

In another aspect of the present disclosure, another semiconductor device is disclosed. The semiconductor device includes an SRAM circuit comprising a shadow latch configured to generate an output signal. The SRAM circuit includes a timing delay circuit electrically coupled to at least one logic gate that generates an enable signal. The semiconductor device includes a sense amplifier electrically coupled to a bitcell. The sense amplifier can receive the enable signal and provide a sense amplifier output signal based on the bitcell. The semiconductor device includes a multiplexer configured to receive the sense amplifier output signal and an output of a master latch, and provide one of the sense amplifier output signal and an output of a master latch as input to the shadow latch.

In yet another aspect of the present disclosure, a method is disclosed. The method includes receiving a clock signal and a DFT enable signal for an SRAM circuit. The method includes generating, based on the clock signal and a timing delay circuit of the SRAM circuit, an enable input for a shadow latch and an enable signal for a sense amplifier. The method includes switching, via a multiplexer according to the DFT enable signal, an output of the SRAM circuit between an output of the sense amplifier and a DFT output. A first output hold of the SRAM circuit in a DFT operating mode is about equal to a second output hold of the SRAM circuit in a normal operating mode.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
    a memory circuit configured to receive a clock signal and generate an output signal, the memory circuit comprising a timing delay circuit;
    a design-for-test (DFT) circuit comprising a shadow latch, the DFT circuit configured to:
        receive an output of the timing delay circuit; and
        generate a DFT output signal via the shadow latch, wherein a first output hold of the output signal is about equal to a second output hold of the DFT output signal;
    a write circuit configured to write data to at least one bitcell;
    a master latch configured to receive an input signal and provide output data to the write circuit and the shadow latch; and
    a plurality of logic gates configured to provide a clock delay that causes a writing data period of the shadow latch to increase according to a predetermined margin.

2. The semiconductor device of claim 1, wherein the DFT circuit is configured to activate upon receiving a scan write test enable signal.

3. The semiconductor device of claim 1, further comprising a multiplexer configured to receive the output signal and the DFT output signal, and provide one of the output signal or the DFT output signal to an output node.

4. The semiconductor device of claim 1, wherein the DFT circuit comprises at least one inverter, the at least one inverter configured to receive the output of the timing delay circuit and generate an input for the shadow latch.

5. The semiconductor device of claim 1, further comprising a sense amplifier circuit configured to generate the output signal via at least one latch.

6. The semiconductor device of claim 5, wherein the sense amplifier circuit is configured to receive the output of the timing delay circuit as an enable signal.

7. The semiconductor device of claim 5, further comprising at least one logic gate that receives the output of the timing delay circuit and a scan write test enable signal, and provides an enable signal to the sense amplifier circuit.

8. A semiconductor device, comprising:
a static random-access memory (SRAM) circuit comprising a shadow latch configured to generate an output signal, the SRAM circuit comprising a timing delay circuit electrically coupled to at least one logic gate that generates an enable signal, wherein the shadow latch is clocked with a clock signal generated based on an output of the timing delay circuit;
a sense amplifier electrically coupled to a bitcell and configured to receive the enable signal and provide a sense amplifier output signal based on the bitcell; and
a multiplexer configured to:
receive the sense amplifier output signal and an output of a master latch; and
provide one of the sense amplifier output signal and the output of the master latch as input to the shadow latch.

9. The semiconductor device of claim 8, wherein the master latch is clocked with a signal generated by a plurality of logic gates based on at least one clock signal and at least one enable signal.

10. The semiconductor device of claim 9, wherein the at least one enable signal comprises one or more of a scan write test enable signal or a write enable signal.

11. The semiconductor device of claim 8, wherein the at least one logic gate is an AND gate, and wherein the enable signal is generated as an output of the AND gate based on an output of the timing delay circuit.

12. The semiconductor device of claim 11, wherein the AND gate further receives a scan write test enable signal as input.

13. The semiconductor device of claim 8, further comprising at least one buffer in series with at least one inverter, the at least one buffer receiving the output of the timing delay circuit and the at least one inverter generating the clock signal for the shadow latch.

14. The semiconductor device of claim 8, wherein the multiplexer is controlled at least in part based on a scan write test enable signal.

15. A method, comprising:
receiving a clock signal and a design for test (DFT) enable signal for a static random access memory (SRAM) circuit;
generating, based on the clock signal and an output generated by a timing delay circuit of the SRAM circuit, an enable input for a shadow latch and an enable signal for a sense amplifier; and
switching, via a multiplexer according to the DFT enable signal, an output of the SRAM circuit between an output of the sense amplifier and a DFT output, wherein a first output hold of the SRAM circuit in a DFT operating mode is about equal to a second output hold of the SRAM circuit in a normal operating mode.

16. The method of claim 15, wherein switching the output of the SRAM circuit comprises switching an input to the shadow latch that generates the output of the SRAM circuit.

17. The semiconductor device of claim 3, wherein the multiplexer comprises a pair of transmission gates.

18. The semiconductor device of claim 5, wherein the sense amplifier circuit is coupled to a bitcell of the memory circuit.

19. The semiconductor device of claim 1, wherein the output signal is provided via a buffer.

20. The semiconductor device of claim 8, wherein the multiplexer comprises a pair of transmission gates.

* * * * *